UNITED STATES PATENT OFFICE.

MAX EPTING, OF HÖCHST-ON-THE-MAIN, GERMANY, ASSIGNOR TO THE FARB-WERKE, VORMALS MEISTER, LUCIUS & BRÜNING, OF SAME PLACE.

RED DYE.

SPECIFICATION forming part of Letters Patent No. 473,453, dated April 26, 1892.

Application filed June 25, 1891. Serial No. 397,520. (Specimens.)

*To all whom it may concern:*

Be it known that I, MAX EPTING, a citizen of the Empire of Germany, residing at Höchst-on-the-Main, in the Empire of Germany, have invented certain new and useful Improvements in the Production of Red Coloring-Matter; and I do hereby declare the following to be a full, clear, and exact description of the invention, such as will enable others skilled in the art to which it appertains to make and use the same.

In the application for Letters Patent, Serial No. 374,616, filed December 13, 1890, is described a process for the production of coloring-matters of the triphenylmethan group. According to this process from diamido-di-ortho-tolylmethan

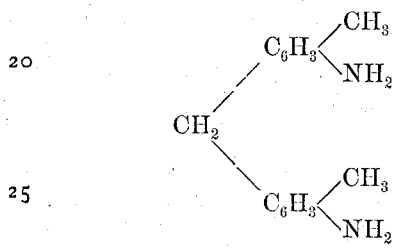

and orthotoluidine is obtained by joint oxidation a novel product not known before—the triamido-triortho-tolylcarbinol

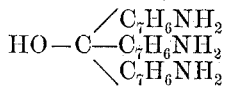

respectively a salt of this body. From this triamido-triortho-tolylcarbinol

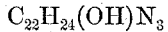

I have produced by sulphonization a novel product, which is the object of the present application for Letters Patent.

By the following description is exemplified the manner of preparing this novel product: One hundred parts, by weight, of triamido-triortho-tolylcarbinol or the equivalent quantity of its hydrochlorate are dissolved in from four hundred to five hundred parts, by weight, of fuming sulphuric acid of about twenty per cent. anhydride and the solution heated to a temperature of from 100° to 120° centigrade until a sample gives a clear solution with ammonia. According to the temperature and to the heating being kept up for a longer or shorter time, there will be obtained mono di or tri sulphonic acid, the last acid being prominent when the heating is made under the conditions specified. The product of the reaction is mixed with water, from which the sulphonic acid can be precipitated by means of sulphate of soda; but it will be found preferable to convert it into the calcium salt by adding lime, then to filter off from the gypsum, and afterward to convert into the sodium salt by means of soda. On evaporating the solution obtained in the latter manner the neutral sodium salt is obtained in the form of a slightly-red-colored powder. When, however, on evaporating, some hydrochloric acid is added, so that a part of the sodium is taken from the neutral salt, the product obtained will present itself in the form of a green mass having metallic luster. In water it is of easy solubility, but in alcohol it is insoluble.

Having thus described my invention and in what manner it can be performed, that what I claim as new and my invention is—

The new dye derived from triamido-triortho-tolylcarbinol, which in the form of its sodium salt is a green mass having metallic luster, of easy solubility in water, but insoluble in absolute alcohol, as set forth.

In testimony whereof I affix my signature in presence of two witnesses.

MAX EPTING.

Witnesses:
 JOSEF REVERDY.
 HEINRICH HAHN.